May 13, 1969 G. E. HUTTON ET AL 3,444,337

DISTRIBUTING FRAME CUT-OVER DEVICE

Filed Dec. 21, 1965 Sheet 1 of 2

INVENTORS G. E. HUTTON
G. L. KNITTLE
E. E. RILEY

BY [signature]
ATTORNEY

May 13, 1969 G. E. HUTTON ET AL 3,444,337

DISTRIBUTING FRAME CUT-OVER DEVICE

Filed Dec. 21, 1965 Sheet 2 of 2

United States Patent Office 3,444,337

Patented May 13, 1969

3,444,337

DISTRIBUTING FRAME CUT-OVER DEVICE

Gerald E. Hutton, Gale L. Knittle, and Emmett E. Riley, Springfield, Ill., assignors to American Telephone and Telegraph Company, New York, N.Y., a corporation of New York Filed Dec. 21, 1965, Ser. No. 515,314
Int. Cl. H04m 1/11
U.S. Cl. 179—178 9 Claims

ABSTRACT OF THE DISCLOSURE

This application describes a telephone central office cut-over switch which consists of a set of transfer contact springs assembled in an insulated body. The body has a finger grip at one end with two connections and a hook-shaped contact spring at the other end. The switch attaches over the heat coils associated with a given telephone line; annd the old switching equipment is connected through the temporary switch while the new equipment is wired to the protector unit which contains the heat coil. For cut-over, a pin which holds the transfer mechanism in one position is removed.

This invention relates generally to telephone central office auxiliary tools and in particular to a device for helping to effect rapid cut-over from a first switching unit to a second.

As is well known in telephone central office practice, a wide variety of situations arise involving cut-over from one switching unit to a second or new unit. The units involved may be in the same building or in different buildings, but in both cases are connected to the lines they serve through a main distribution frame. Typically, cut-over entails running connections from the new units which parallel connections of the old unit and terminate with them on the vertical side of a main frame. The new unit is blocked open as, for example, with blocking pins in the line link frame. Thereafter, usually at a time of low line usage, the new unit is unblocked and more or less simultaneously the connections to the old equipment are disengaged by severing or otherwise removing them, possibly for reconnection elsewhere.

This procedure cannot be followed, however, in installing switching units which are difficult to block open such as the new electronic switching units. Moreover, the method described is frequently time-consuming and tends to interfere unduly with service on the affected lines.

The present invention relates to a low-cost easy-to-operate transfer device employed upon the conventional protectors along the vertical side of the main frame, which in effect provides a temporary connection between the outside line and the old equipment while the new equipment is installed and connected to the horizontal side.

A principal object of the invention is to effect a rapid cut-over in a telephone central office from old switching equipment to new.

Another object of the invention is to reduce or eliminate the down time on individual lines during each cut-over.

A further object of the invention is to enable simultaneous cut-over to the new gear of all lines served by an old switching unit.

In accordance with the invention, the device is a 3-spring transfer mechanism that plugs on over a heat coil of the protector unit. Typically, each incoming conductor pair and the associated pair of leads to the switching equipment are interconnected through two separate heat coils. Each coil is conductively supported between an outer spring and a corresponding inner spring of the protector. The top spring of the transfer device contacts the outer protector spring raising it off the top terminal of the heat coil. The center spring of the device then contacts this terminal. A suitable lead from the old unit is connected to the bottom spring of the device. The center spring is biased to contact the upper spring normally, but is held in contact with the bottom spring by a retractable pin or other means to provide temporary connection to the old equipment. A wire from the new unit in due course is connected to the now open-circuited outer protector terminal. In similar fashion, the tip and ring conductors of each pair of leads from the old unit and from the new unit are connected.

For cut-over, all pins are withdrawn simultaneously, thereby transferring the center spring in each device from the bottom spring to the top spring therein. The old equipment is thereby disconnected and the new cut in. When the devices are removed the outer protector springs return to their heat coil terminals.

Each transfer device is readily fabricated by conventional molding methods, costs relatively little and can be re-used indefinitely.

A feature of the invention, accordingly, resides in a 3-spring transfer device operative principally in conjunction with conventional main frame protectors, which provides in effect a second set of terminals to which central office equipment may be connected readily for temporary periods.

Another feature of the invention involves the near instantaneous transfer of a given subscriber line from one set of protector terminals to the mentioned additional set of terminals.

A further feature of the invention relates to a method for simultaneous cut-over of thousands of lines where necessary, from an old switching unit to a new one.

These and other objects and features of the invention are delineated in detail in the description to follow of an illustrative embodiment thereof and in the drawing in which.

Figure 1A:
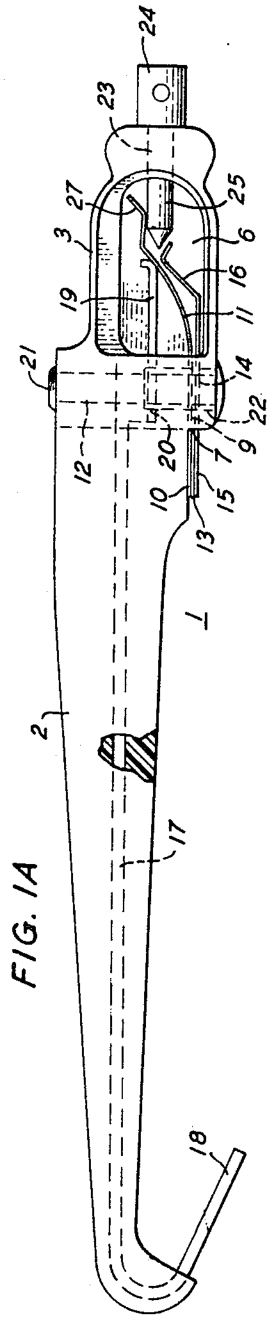
FIGS. 1A, 1B and 1C are top, side and bottom views, respectively, of such a device.
Figure 1B:
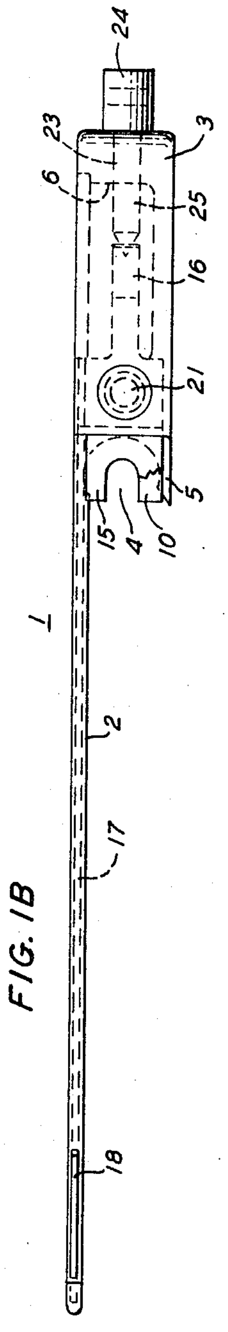
Figure 1C:
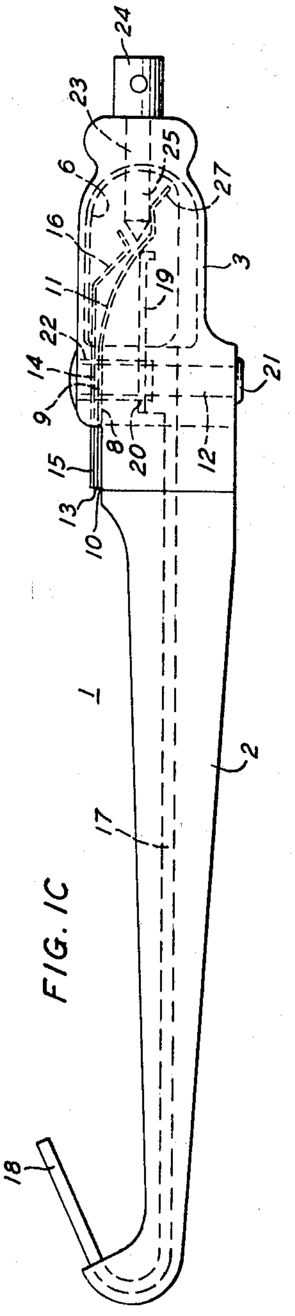

As shown in FIGS. 1A, 1B and 1C, the transfer device comprises an insulative body portion 1 with an elongated arm 2 offset to one side of body 1, and a body handle 3. A vertical continuous recess 4 in body portion 1, just forward of handle 3, is defined by an extension 5 of body 1 and an opposite section of arm 2. A hollow interior 6 opens to one side of handle 3, as shown in FIG. 1A, and a narrow slit or passage 7 joins recess 4 and interior 6.

FIG. 1A shows passage 7 opening onto recess 4, seen in FIG. 1B which includes a shelf or bottom portion 8 as in FIG. 1C. Resting on shelf 8 is a lower contact member 9 having an end 10 in the shape of a spade tip extending into recess 4 and at the opposite end a spring leg 11 extending into interior 6. Aligned with contact member 9 is an upper contact member 14, also with a spade tip-type end 15 and a spring leg 16 extending into interior 6. An insulative shim 13 separates members 9 and 14.

Embedded within arm 2 is an elongated conductor 17, with an outer terminal 18 extending out of the far end of arm 2 and a rigid inner terminal 19 extending into interior 6, in alignment with and immediately above (FIG. 1A) spring legs 11 and 16. Advantageously, body 1, shank 2 and handle 3 are molded as a unit, using preferably a hi-tensile strength plastic that is easily molded of a grade 1 phenoxy resin self-extinguishing material.

A pin 21 seats in a vertical guide hole 12 in body 1 and passes through retaining apertures in contact members 9 and 14, and a block portion 20 of conductor 17. An elongated insulative cap 22 mounts in a friction fit onto the end of pin 21, and extends down to members 9 and 14 to retain them in position.

At the end of handle 3 opposite recess 4, a horizontal guide hole 23 is provided which frictionally seats a fiber pin 24. The shaft 25 of pin 24 extends into interior 6. When fully extended thereinto, shaft 25 contacts an offset portion 27 of spring leg 11 so as to force the latter out of contact with spring leg 16 with which it is normally in contact. At the same time, shaft 25 forces spring leg 11 into contact with inner terminal 19 of conductor 17. Withdrawal of pin 24 allows leg 11 to return to contact with leg 16.

Thus, by inserting pin 24 fully, a circuit is completed between outer terminal 18 of conductor 17 and end 10 of lower contact member 9. At the same time, the circuit between end 10 and end 15, normally completed through contact of leg 11 with leg 16, is interrupted. Removal of pin 24 effects a return to this normal contacting condition.

Figures 1D, 2:
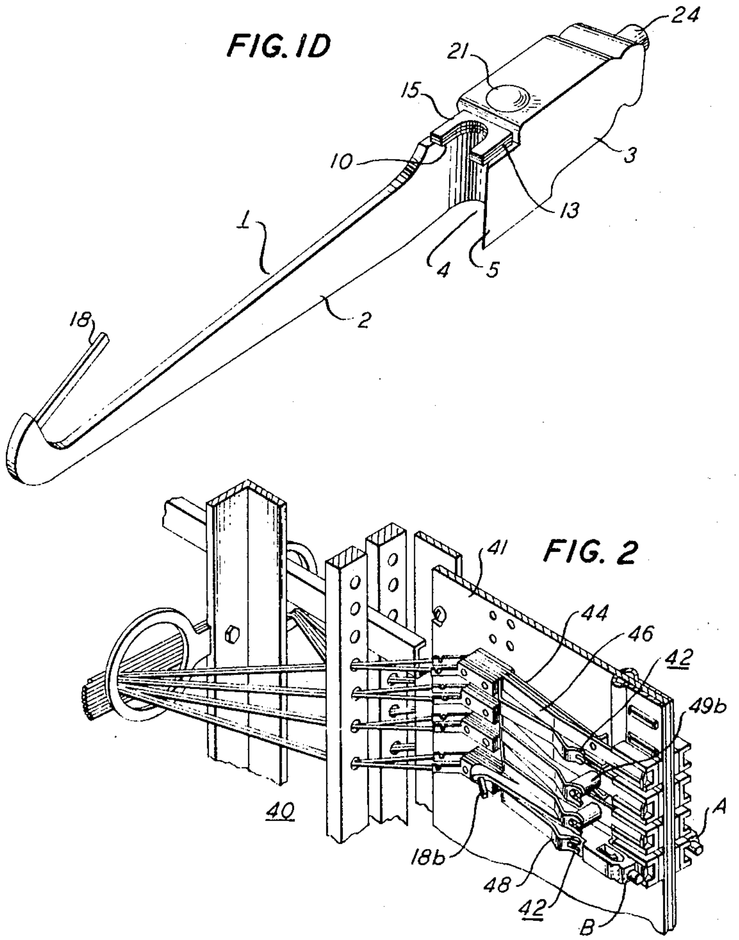
FIG. 1D is a partial frontal perspective of the body of the device.
FIG. 2 is a frontal perspective showing a transfer device in position on a main frame protector.
Figure 3:
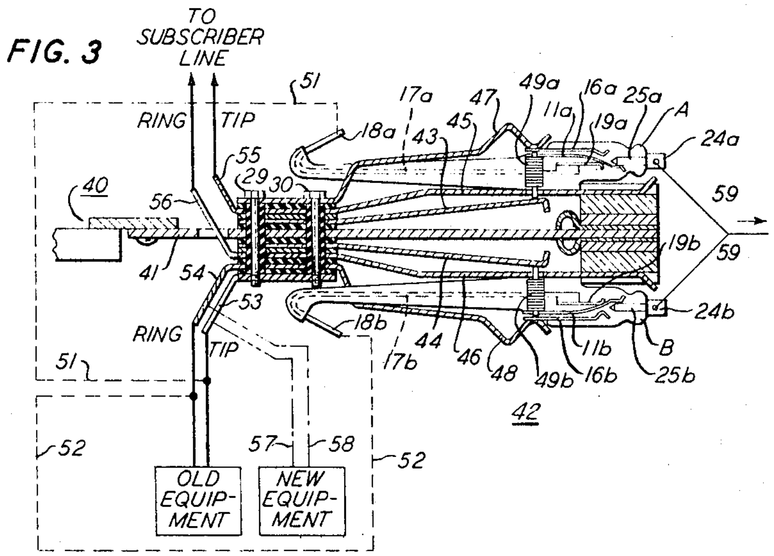
FIG. 3 is a schematic diagram showing operation and use of two such devices upon a protector.

FIG. 2 illustrates the manner of installation of the transfer device. As shown therein, a portion of a conventional central office main frame, designated generally as 40, supports a ground bar 41 to which is fastened a number of protectors 42 (only four shown). With reference now also to FIG. 3, each protector 42 consists of two heat coil grounding springs 43, 44 on opposite sides of ground bar 41, respectively flanked by two inner support springs 45, 46 representing the subscriber line or interoffice contacts. Outwardly of inner springs 45, 46 are outer support springs 47, 48 which are the central office contacts. Between each pair of opposed springs 46, 48 and 45, 47 is mounted a conventional heat coil 49. The protectors are fastened in rows to ground bar 41 by suitable means such as the bolts 29, 30 shown in FIG. 3.

The manner of effecting cut-over from old switching equipment to new with the aid of the transfer device of the present invention may be more readily understood by referring to FIG. 3. For illustration, it is assumed that the old unit and the new are in the same building. At a suitable time during the installation of the new switching equipment in the central office, two cut-over devices A and B with pins in place are made available for each protector. Leads 51, 52 are suitably connected between the tip and ring connections of the old unit and the outer terminals **18*a* and 18*b* of the devices. Preferably when the particular line involved is not in use, the devices are plugged onto respective heat coils of the protector. Spring legs 16*a* and 16*b* lift the respective protector outer springs 47 and 48 out of contact with their heat coils. The tip and ring leads to the old equipment are now normally removed from the protector terminals 53, 54**, since these terminals or their equivalent will be used to connect in the new units. The above steps are repeated for all protectors whose lines are involved in the change-over.

With the transfer devices thus installed, the old equipment and system function normally. Since pins **24*a* and 24*b* are inserted, a circuit is completed between the subscriber tip lead and the old equipment, via protector tip terminal 55, inner springs 45, lower terminal of heat coil 49*a*, upper terminal of heat coil 49*a*, spring leg 11*a*, inner terminal 19*a*, conductor 17*a*, outer terminal 18*a* and auxiliary lead 51. Similarly, a circuit is completed between the subscriber ring lead and the old equipment, via protector ring terminal 56, inner springs 46, the terminals of heat coil 49*b*, spring leg 11*b*, inner terminal 19*b*, conductor 17*b*, outer terminal 18*b* and auxiliary lead 52**.

At a convenient time, leads 57, 58 from the new equipment are run to office tip and ring terminals 53, 54 associated with the particular line. These terminals are still dead, however, since the outer springs 47, 48 to which they are respectively connected are open-circuited by the action of the transfer devices A and B.

When all of the leads from the new equipment have been connected to the protectors as described above, the system is ready for change-over. In accordance with the invention, this is achieved simultaneously for all lines involved, and almost instantaneously, by yanking out the pins. Removal of the pins allow inner springs **11*a* and 11*b* to spring back to their normal position of respective contact with outer legs 16*a*, 16*b*. This action breaks the circuit between the subscriber line and terminals 19*a*, 19*b* to which the old equipment is fastened; and closes the circuit between the subscriber line and outer springs 16*a*, 16*b*, to effect connection to the new equipment as earlier described. One easy way to accomplish this is with strings, such as 59**, tied to each pin.

After change-over, the individual transfer devices are removed from their respective heat coil mountings at any convenient time, preferably when the subscriber line is not in use. The outer springs thereupon quickly come to rest again upon the adjoining heat coil outer terminal and resume normal operation. Each device may, of course, readily be salvaged for use in another change-over.

It should be noted that, although the transfer device of the instant invention has been described principally in connection with a change-over affecting subscriber lines, it is equally useful for aiding changeover when interoffice trunk lines are involved. Also, other uses for the transfer device will occur to switchmen and others working in this field.

One illustrative embodiment of the inventive concept has been shown and described. It is to be expressly understood that various changes and modifications may be made therein without departing from the spirit and scope of the invention.

What is claimed is:

1. In an electrical connector in which a first terminal and a second terminal are normally in contact and support separate wires, apparatus for substituting an auxiliary terminal for said second terminal so that the latter can be rewired, comprising, in combination:

(a) means including first and second spring members in contact respectively with said first and second terminals and insertable therebetween, for forcing said terminals apart;

(b) means including a third spring member for effecting an auxiliary connection to the wire supported by said second terminal, said wire thereafter being disconnected from said second terminal and a new wire being connected thereto; and (c) means for selectively connecting said first spring member either to said second spring member or to said third spring member, whereby an auxiliary connection may be effected between said first and second terminals and concurrently a disconnection may be effected between said first terminal and said auxiliary terminal.

2. A transfer device for substituting temporarily an auxiliary terminal for an outer spring terminal of a telephone central office main frame protector, said outer spring terminal supporting a first wire, and for selectively connecting the outer terminal of an associated protector heat coil either with the auxiliary terminal or with the outer spring terminal, said device comprising, in combination:

(a) a body including an interior volume, and a forward recess for accommodating said device to said heat coil;

(b) first and second conductive means mounted in said body in aligned, spaced-apart relation, each said means having a first end extending into said recess and a second end extending into said interior volume, the first end of said first conductive means contacting said outer spring and removing same from said heat coil outer terminal and the first end of said second conductive means contacting said heat coil outer terminal;

(c) third conductive means mounted in said body and having a first end extending forwardly of said recess and a second end extending into said inner volume, said first end serving as said auxiliary terminal, said first wire being transferred to said auxiliary terminal and a new wire being connected to said outer spring terminal; and (d) switch means for selectively bringing said second end of said first conductive means in contact either with said second end of said first conductive means or with said second end of said third conductive means, whereby an auxiliary connection is effected between said heat coil outer terminal and said outer spring and concurrently a disconnection is effected between said heat coil outer terminal and said auxiliary terminal.

3. A transfer device in accordance with claim 2 wherein said first and second conductive means each comprise an elongated flat contact spring and wherein said body further comprises an elongated shank extending forwardly of said recess and offset to one side of said body, said third conductive means being extended into said shank and insulated thereby.

4. A transfer device in accordance with claim 2 wherein said switch means comprises:

(a) a pin including a shaft;

(b) means for frictionally mounting said shaft for movement into and out of said interior volume;

(c) means responsive to insertion of said shaft into said interior volume for urging said second end of said first conductive means into contact with said second end of said third conductive means; and (d) means responsive to withdrawal of said shaft from said interior volume for urging said second end of said first conductive means out of contact with said third conductive means and into contact with said second end of said second conductive means, whereby when said pin is inserted, a circuit path is completed from said heat coil to said third conductive means with said outer spring open-circuited; and when said pin is removed, a circuit path is completed from said heat coil to said first conductive means, with said third conductive means open-circuited.

5. A transfer device in accordance with claim 2 wherein said body and said shank are fabricated of polyethylene.

6. A transfer device in accordance with claim 2 wherein said interior volume of said body opens onto the side of said body opposite the side from which the shank extends.

7. A transfer device in accordance with claim 4 wherein said first, second and third conductive means are disposed in substantially parallel relation in a plane substantially parallel to the plane of said shank; and wherein said pin shaft is mounted in the end of said body opposite said recess and in a plane substantially parallel to the plane of said shank.

8. In a telephone central office in which each tip and ring conductor pair is connected to the central office switching units through separate two-coil protectors located at a main distribution frame, a method for relieving an entire old switching unit while simultaneously cutting in an entire new switching unit, comprising the steps of:

(a) connecting an auxiliary terminal to each tip and corresponding ring lead from the old unit;

(b) connecting each said tip and ring auxiliary terminal to the heat coil outer terminals of said protector which correspond respectively to tip and ring sides of the line;

(c) removing each protector outer spring from the corresponding heat coil outer terminal;

(d) removing from each said outer spring the tip and ring connections to the old unit;

(e) connecting all tip and ring conductor pairs from the new switching unit to the appropriate protector outer springs; and (f) effecting simultaneously auxiliary connections between all heat coil outer terminals and their corresponding outer springs, and concurrently effecting simultaneous disconnections of all said auxiliary terminals with their corresponding heat coil outer terminals.

9. The method as described in claim 8 including the further step of removing said auxiliary connections between the outer terminals and the corresponding outer springs, and concurrently returning the outer springs to their corresponding heat coil outer terminals.

References Cited

UNITED STATES PATENTS

| | | | |
|---|---|---|---|
| 674,402 | 5/1901 | Douglas | 179—95 |
| 3,283,274 | 11/1966 | De Falco | 179—158 |

KATHLEEN H. CLAFFY, *Primary Examiner.*

A. A. McGILL, *Assistant Examiner.*

U.S. Cl. X.R.

179—95; 317—99